Aug. 5, 1969 P. J. LANE ET AL 3,459,899

TONE CALLING ARRANGEMENTS FOR TELEPHONE SUBSTATION CIRCUITS

Filed July 21, 1965 4 Sheets-Sheet 1

TONE CALLING ARRANGEMENTS FOR TELEPHONE SUBSTATION CIRCUITS

Filed July 21, 1965 4 Sheets-Sheet 3

United States Patent Office 3,459,899

Patented Aug. 5, 1969

3,459,899

TONE CALLING ARRANGEMENTS FOR TELEPHONE SUBSTATION CIRCUITS

Peter John Lane, Dartford, Kent, and Rodney Edward William Wheeler, Erith, Kent, England, assignors to Associated Electrical Industries Limited, London, England, a British company Filed July 21, 1965, Ser. No. 473,683

Claims priority, application Great Britain, July 28, 1964, 29,987/64

Int. Cl. H04m *1/00*

U.S. Cl. 179—84 2 Claims

ABSTRACT OF THE DISCLOSURE

A telephone substation arrangement in which the microphone transducer is also utilized for emitting tone calling signals when the handset is in the rest position on the base, the tone calling signals being derived from a transistor oscillator at the substation that is energized by ringing signals received over the line. When the handset is lifted the gravity switch contacts connect a transistor amplifier incorporating at least one of the transistors from the oscillator to amplify signals from the microphone for transmission over the line. Windings of the anti-sidetone induction coil are utilized to provide a a positive feedback path in the transistor oscillator.

Figure 1:
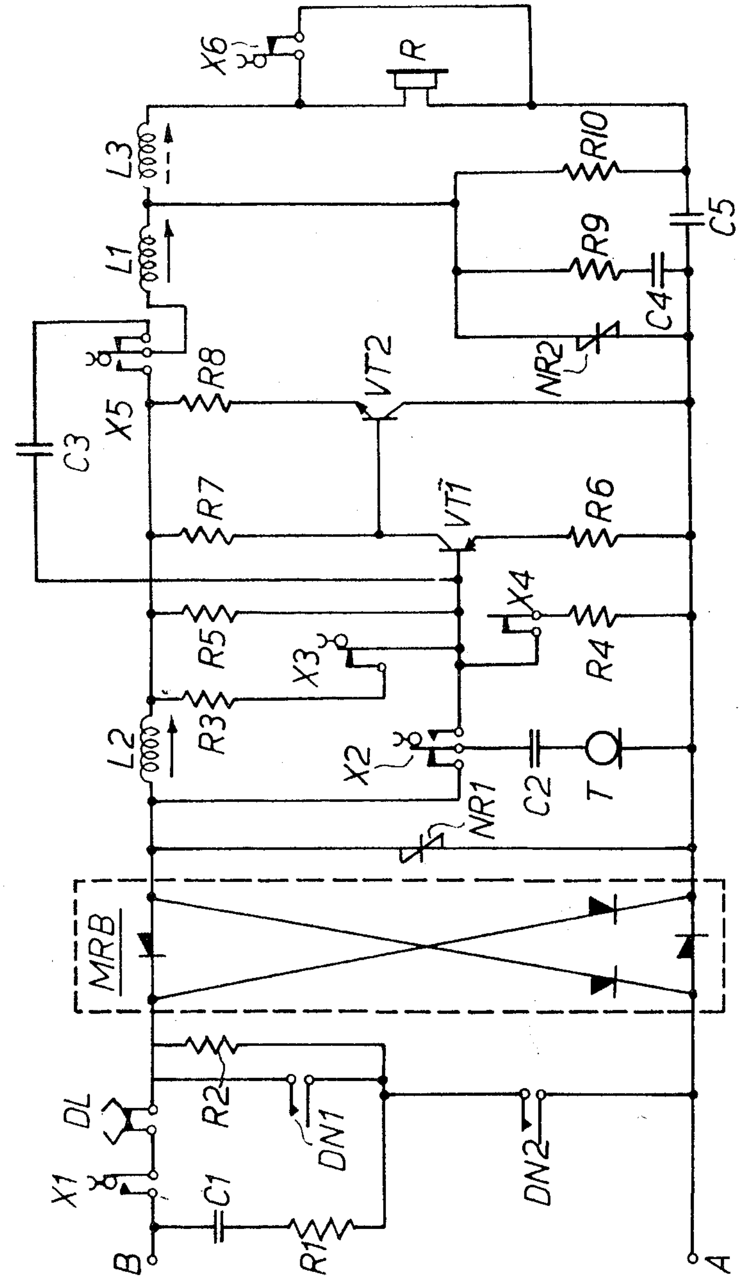

This invention relates to telephone system substation circuits.

It has previously been proposed to arrange, in a telephone system substation circuit, that one and the same electro-acoustic transducer of electromagnetic type serves both as the transmitter (microphone) of the circuit and also as a so-called tone sounder for producing an audible calling signal, and that a transistor included in the circuit serves to constitute an oscillator for supplying operating tone current to this transducer when this transducer is serving as a tone sounder and to constitute an amplifying stage for amplifying the electric output of this transducer when this transducer is serving as the transmitter.

The present invention provides efficient and economic forms of telephone system substation circuit each of which is such that (i) one and the same electro-acoustic transducer serves both as the transmitter and as a tone sounder, (ii) a transistor oscillator for supplying operating tone current to this transducer when this transducer is serving as a tone sounder and a transistor amplifier for amplifying the electric output of this transducer when this transducer is serving as the transmitter have a transistor or transistors common to them, and (iii) an anti-sidetone induction coil serves additionally as a coupling means, providing positive feedback, in the circuit of said oscillator.

According to the invention, there is provided a telephone system substation circuit which includes a multi-winding induction coil, a transistor or transistors, an electro-acoustic transducer included in a handset and serving both as the transmitter and as a tone sounder, and gravity-switch contacts operated upon the lifting or removal of the handset from its normal or "on rest" position, and wherein the normal condition of the circuit is one in which said transducer is connected to serve as a tone sounder and in which a transistor oscillator for supplying operating tone current to this transducer in response to received alternating ringing current is constituted by the transistor or transistors or one or more of the transistors and in which the induction coil serves as a coupling means, providing positive feedback, in the circuit of this oscillator, and wherein the circuit changes effected by the gravity-switch contacts upon their operation serve to bring the circuit to a condition in which said transducer is connected to serve as the transmitter and in which a transistor amplifier for amplifying the electric output of this transducer is constituted by the transistor or transistors and in which the induction coil serves as an anti-sidetone induction coil.

The features of the invention are exemplified in the four specific embodiments of the invention which will now be described with reference to the accompanying drawings. Each of the specific embodiments takes the form of a central battery telephone system substation circuit which includes a three-winding induction coil, either one or two transistors, and two electro-acoustic transducers of electromagnetic type included in a handset and one serving as the receiver and the other serving both as the transmitter and as a tone sounder. Each substation circuit concerned further includes, of course, gravity-switch contacts operated upon the lifting or removal of the handset from a normal or "on rest" position.

Figure 2:
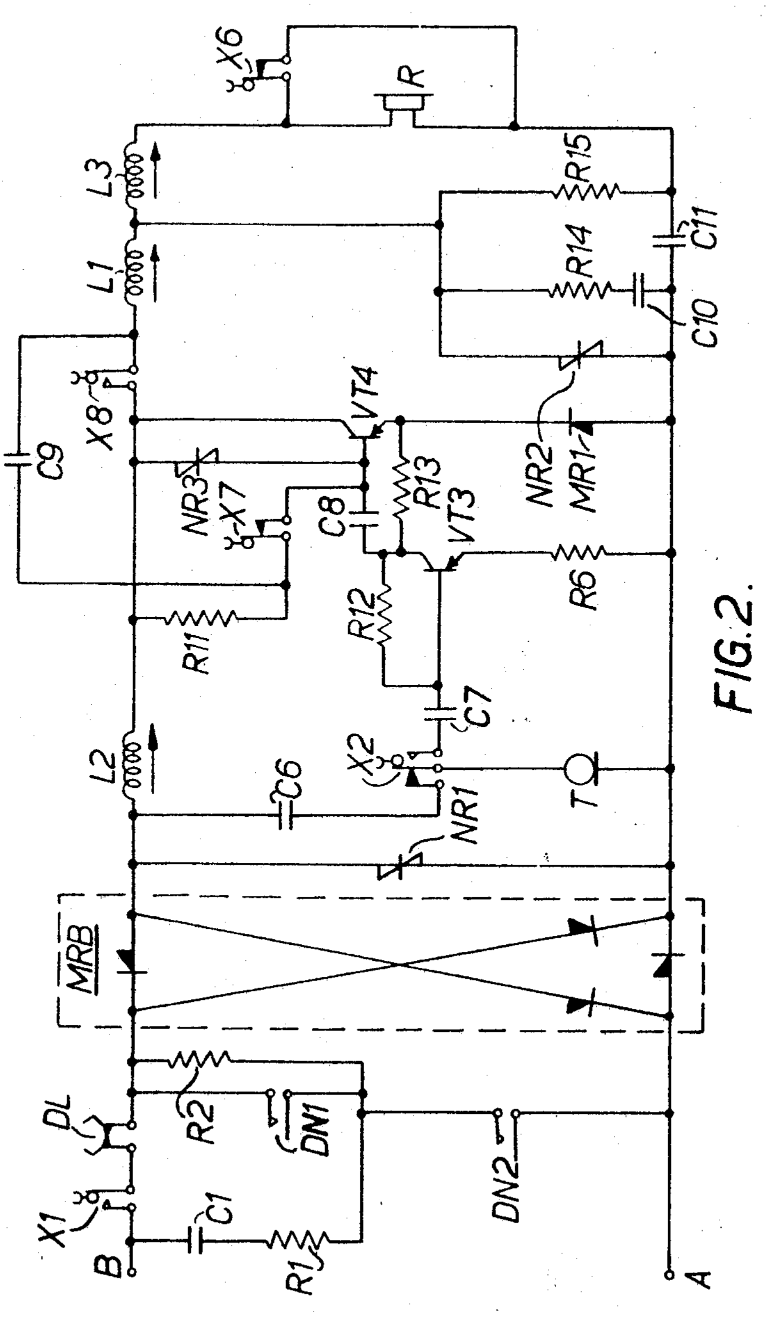
Figure 3:
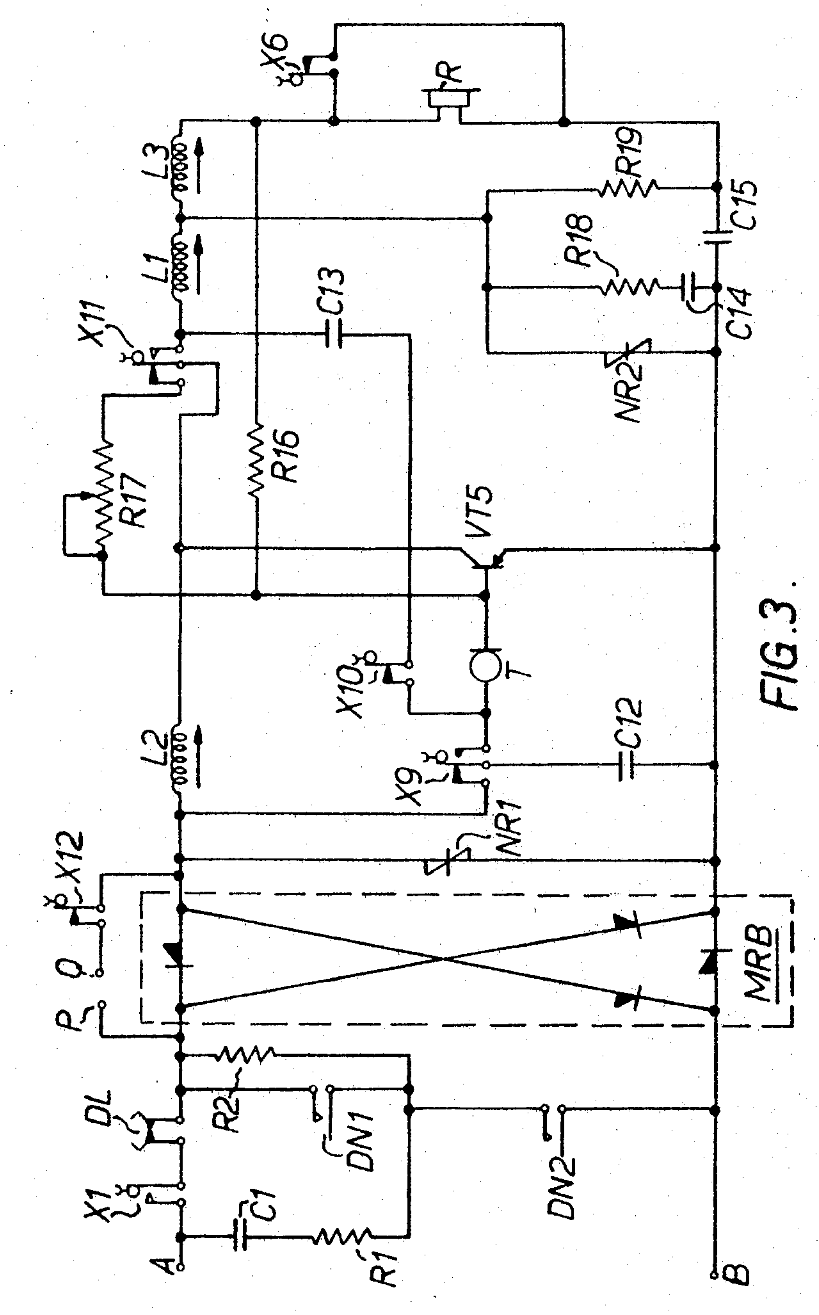
Figure 4:
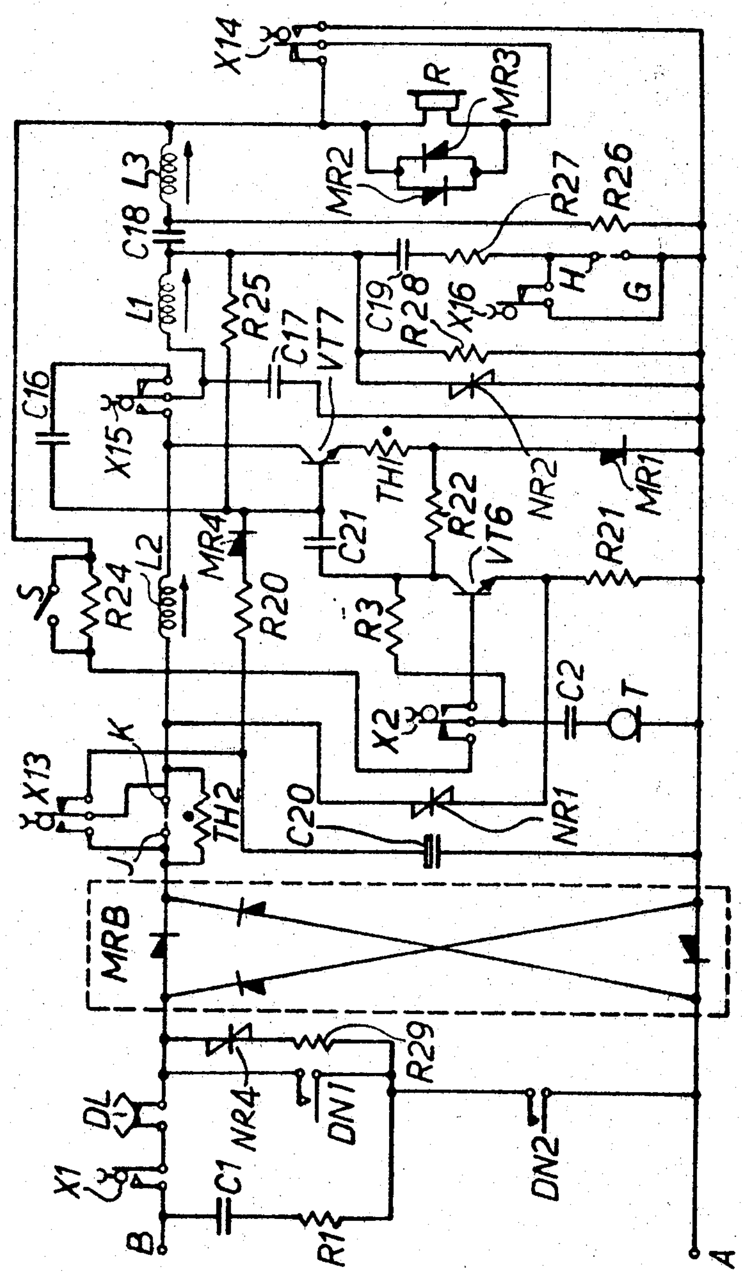

FIG. 1 of the drawings is a circuit diagram of a substation circuit which constitutes one of the specific embodiments referred to and which employs two silicon transistors. FIG. 2 is a circuit diagram of a substation circuit which constitutes another of these specific embodiments and which employs two germanium transistors. FIG. 3 is a circuit diagram of a substation circuit which constitutes a further one of the four specific embodiments and which employs a single germanium transistor. FIG. 4 is a circuit diagram of a substation circuit which constitutes the remaining one of these specific embodiments and which employs two silicon transistors.

To simplify the description, corresponding elements in the different figures are given the same designations.

Referring firstly to FIG. 1 and the central battery telephone system substation circuit illustrated in this figure, the substation circuit has two line terminals A and B to which are connected, when the circuit is equipped for use at a subscriber's premises, the two line wires of the subscriber's line. In the figure, six gravity-switch contacts X1 to X6, a dial impulsing contact DL, and two dial off-normal contacts DN1 and DN2 of the substation circuit are shown in their unoperated conditions, i.e. in the conditions which they are in when the substation circuit is in its normal condition. The electro-acoustic transducer R of electromagnetic type that serves as the receiver is short-circuited over gravity-switch contact X6 when the substation circuit is in its normal condition. The electroacoustic transducer T of electromagnetic type that serves both as the transmitter and as a tone sounder has a capacitor C2 connected permanently in series with it. The substation circuit includes a rectifier bridge MRB which serves for rectifying low-frequency (for instance 17-cycles-per-second) alternating ringing current received over the line wires for calling the substation, and also serves to render it immaterial, so far as the application of operating voltages of correct polarities to the two silicon transistors VT1 and VT2 included in the substation circuit is concerned, whether terminals A and B are positive and negative terminals respectively, or negative and positive terminals respectively. Transistor VT1 is of the p-n-p type and transistor VT2 is of the n-p-n type. The three windings L1, L2 and L3 of the induction coil of the substation circuit may be wound to have 513 turns, 855 turns, and 300 turns respectively. The substation circuit includes two varistors NR1 and NR2. Varistor NR1 has several functions. Its presence ensures that the induction coil when serving as an anti-sidetone induction coil always has a line side terminating load that is finite. It serves to effect automatic speech-sending sensitivity regulation in dependence upon the magnitude of the direct current flowing in the line wires and supplied from the exchange (i.e., in practice, in dependence upon the length of the subscriber's line). It serves to protect the transistors VT1 and VT2 by limiting the voltages applied to them in respect of transient or surge voltages appearing across the line wires, and it serves to reduce, by sharing current and especially in the case where the subscriber's line is a short one, the direct current power dissipated in these transistors. Varistor NR2 forms one element of a balance network constituted by (in all) this varistor, two capacitors C4 and C5, and two resistors R9 and R10, and helps to ensure a good anti-sidetone performance by the substation circuit by causing this network to be, in respect of the induction coil when this is serving as an anti-sidetone induction coil, a line balance that varies in dependence upon the magnitude of the direct current flowing in the line wires and supplied from the exchange (i.e., in practice, in dependence upon the length of the subscriber's line). Varistor NR2 also serves to augment the effects of varistor NR1 in regard to limitation of the voltages applied to the transistors VT1 and VT2 in respect of transient or surge voltages appearing across the line wires, and in regard to reduction of the direct current power dissipated in these transistors. In the normal condition of the substation circuit, a capacitor C1 causes there to be an effective open circuit between the line terminals A and B so far as direct current paths internal to the substation circuit are concerned, so that line insulation tests can be made from the exchange. This capacitor is of sufficient capacity (for example 2 microfarads or thereabouts) to enable line continuity tests to be made from the exchange using the "charging capacitor" method. Also, in the normal condition of the substation circuit the presence in the input circuit of a series resistor R2 of fairly high resistance (for example 4700 ohms), and the fact that the rectifier bridge MRB is formed of selenium rectifier units having characteristics such that all four arms of the bridge remain substantially non-conducting unless a voltage of a magnitude in excess of about 2 volts is applied across the input terminals of the bridge, cause the substation circuit to present a high input impedance as seen from the line. This is, of course, a feature that is especially advantageous when such substation circuits are connected in parallel. Two biasing resistors R3 and R4, which may have resistances of 2000 ohms and 150 ohms respectively, serve to ensure that transistor VT1 remains substantially nonconducting unless the rectifier bridge MRB produces an output voltage (across varistor NR1) in excess of a threshold value that is produced by an input voltage across terminals A and B of the order of 20 to 30 volts, with the consequence that the substation circuit possesses a useful degree of immunity from false operation of the electro-acoustic transducer T, acting as a tone sounder, by transients on the line. Transistor VT1 has an emitter circuit resistor R6 and a collector circuit resistor R7, and transistor VT2 has an emitter circuit resistor R8. The two transistors are directly coupled to form two serially-related amplifying stages, and transistor VT2 remains substantially non-conducting as long as transistor VT1 remains substantially non-conducting. In the normal condition of the substation circuit, the transducer T and capacitor C2 are connected so that they are included, in series relationship with induction coil winding L2, in the output circuit of the amplifying stage constituted by transistor VT2, the transducer T being thereby connected to serve as a tone sounder. Further, in the normal condition of the substation circuit, the two induction coil windings L1 and L3 are connected to cause the induction coil to serve, by virtue of the inductive coupling between its winding L2 and these two windings, as a coupling means providing positive feedback from the output circuit of the amplifying stage constituted by transistor VT2 to the input circuit of the amplifying stage constituted by transistor VT2 to the input circuit of the amplifying stage constituted by transistor VT1. The relevant manner of connection of windings L1 and L3 is such that these windings are connected in a complex circuit comprising, in addition to these windings, the previously-mentioned balance network and a capacitor C3, and extending between the lower (as shown) end of the emitter circuit resistor R6 of transistor VT1 and the base of this transistor. This provision for positive feedback is such as to cause the two serially-related amplifying stages formed by transistors VT1 and VT2 to constitute a transistor oscillator for supplying operating tone current to the transducer T in response to received low-frequency alternating ringing current.

Upon the receipt (while the substation circuit is in the normal condition) of low-frequency alternating ringing current over the line wires, the rectifier bridge MRB produces, in respect of each half-wave of the received ringing current, an output pulse that attains a voltage in excess of the threshold value referred to, and that is thus capable of bringing about the conduction of transistors VT1 and VT2. The transistor oscillator constituted by transistors VT1 and VT2 oscillates for a period within the duration of each such output pulse, and during each such period supplies operating tone current to transducer T. The frequency of oscillation is determined mainly by the values of the capacitors C2, C3 and C5 and the inductances of the transducer T and of the windings of the induction coil. It will be clear, from what has just been said, that while low-frequency alternating ringing current is being received over the line wires the transducer T is supplied with operating tone current that is interrupted at twice the frequency of this low-frequency alternating ringing current. The fairly high resistance (for example 4700 ohms) of resistor R2 prevents any substantial loss of tone current to line.

When the handset is lifted or removed, the gravity-switch contacts X1 to X6, upon their resulting operation, effect circuit changes that serve to bring the substation circuit to a condition that is as follows (ignoring for the time being what happens during dialling at the substation). The series circuit comprising capacitor C1 and resistors R1 and R2 is short-circuited over contacts X1 and DL. The transducer T and capacitor C2 are connected in the base circuit of transistor VT1, the transducer T being thereby connected to serve as the transmitter of the substation circuit. Resistors R3 and R4 are disconnected. As a consequence of the fact that resistor R3 is disconnected, a resistor R5 of high resistance (for example 150,000 ohms) becomes effective for determining the biasing voltage applied to the base of transistor VT1 for the purposes of speech amplification by this transistor, the two transistors VT1 and VT2 constituting in this instance a two-stage transistor amplifier for amplifying the electric output of the transducer T and feeding amplified speech currents to line. The necessary direct current supply for this two-stage transistor amplifier is provided, of course, by direct current flowing in the line wires and supplied from the exchange. The two induction coil windings L1 and L3 are connected to cause the induction coil to serve in known manner as an anti-sidetone induction coil, contact X6 being open so that the transducer R that serves as the receiver is effectively in circuit.

During dialling at the substation, the dial off-normal contacts DN1 and DN2 are closed and place a short-circuit across the line wires of the substation circuit on the line side of the rectifier bridge MRB. The closing of contact DN1 serves additionally to cause the resistor R1 and the capacitor C1 to be effectively connected directly across the dial impulsing contact DL to form a spark-quenching circuit for this impulsing contact.

The capacities of capacitors C2, C3, C4 and C5 may be 0.5 microfarad, 0.5 microfarad, 0.15 microfarad, and 0.25 microfarad respectively, and the resistances of resistors R1, R6, R7, R8, R9 and R10 may be 33 ohms, 10 ohms, 1000 ohms, 10 ohms, 33 ohms, and 68 ohms respectively.

Referring now to FIG. 2 and the central battery telephone system substation circuit illustrated in this figure, only points in which this substation circuit differs from the substation circuit of FIG. 1 will be dealt with. In this substation circuit there are five gravity-switch contacts X1, X2, X6, X7, and X8, all of which are shown in their unoperated conditions. Both of the two germanium transistors VT3 and VT4 included in the substation circuit are of the p-n-p type. In this substation circuit there is a third varistor NR3, and there is also a selenium rectifier MR1. In the normal condition of the substation circuit, the transducer T and a capacitor C6 are connected so that they are included, in series relationship with induction coil winding L2, in the output circuit of the amplifying stage constituted by transistor VT4, the transducer T being thereby connected to serve as a tone sounder. Further, in the normal condition of the substation circuit, the two induction coil windings L1 and L3 are connected to cause the induction coil to serve, by virtue of the inductive coupling between its winding L2 and these two windings, as a coupling means providing positive feedback from the output circuit of the amplifying stage constituted by transistor VT4 to the input circuit of this amplifying stage. The relevant manner of connection of windings L1 and L3 is such that these windings are connected in a complex circuit comprising, in addition to these windings, a balance network (NR2, C10, C11, R14, R15) and a capacitor C9, and extending between the lower (as shown) terminal of selenium rectifier MR1 and the base of transistor VT4. This provision for positive feedback is such to cause the amplifying stage formed by transistor VT4 to constitute a transistor oscillator for supplying operating tone current to the transducer T in response to received low-frequency alternating ringing current. In the normal condition of the substation circuit, the varistor NR3 has a resistor R11 connected in parallel with it to provide for the proper biasing of the base of transistor VT4 during operation of this transistor as an oscillator.

Upon the receipt (while the substation circuit is in the normal condition) of low-frequency alternating ringing current over the line wires, the transistor oscillator constituted by transistor VT4 oscillates for a period within the duration of each output pulse produced by the rectifier bridge MRB in respect of the received ringing current, and during each such period supplies operating tone current to transducer T. The frequency of oscillation is determined mainly by the values of the capacitors C6, C9 and C11 and the inductances of the transducer T and of the windings of the induction coil. The components VT3, C8, R6, R12 and R13 have little effect on the operation of the substation circuit so far as operation in response to received ringing current is concerned.

When the handset is lifted or removed, the gravity-switch contacts X1, X2, X6, X7 and X8 upon their resulting operation, effect circuit changes that serve to bring the substation circuit to a condition in which certain components are connected and serve as follows (ignoring what happens during dialling at the substation). The transducer T is connected, in series with a capacitor C7, in the base circuit of transistor VT3, the transducer T being thereby connected to serve as the transmitter of the substation circuit. As a consequence of the opening of contact X7, the biasing of the base of transistor VT4 is determined by varistor NR3 alone instead of by this varistor in parallel with resistor R11. The two transistors VT3 and VT4 constitute a two-stage transistor amplifier for amplifying the electric output of the transducer T and feeding amplified speech currents to line, the necessary direct current supply for this amplifier being provided, of course, by direct current flowing in the line wires and supplied from the exchange. The direct current supply for transistor VT3 is stabilized, so far as voltage is concerned, by being derived from across the forward-biased selenium rectifier MR1. The stabilized voltage across this rectifier may be of the order of 3 volts. The two transistors VT3 and VT4 are resistance-capacity coupled, the coupling resistance and the coupling capacitance being constituted by a resistor R13 and a capacitor C8 respectively. A resistor R12 provides for a suitable biasing of the base of transistor VT3. As a consequence of the closing of contact X8, the two induction coil windings L1 and L3 are connected to cause the inductance coil to serve as an anti-sidetone induction coil.

The capacities of capacitors C6, C7, C8, C9, C10 and C11 may be 0.5 microfarad, 2 microfarads, 1 microfarad, 0.5 microfarad, 0.9 microfarad, and 1.8 microfarads respectively, and the resistances of resistors R11, R12, R13, R14 and R15 may be 1200 ohms, 82,000 ohms, 560 ohms, 33 ohms, and 180 ohms respectively.

Referring now to FIG. 3 and the central battery telephone system substation circuit illustrated in this figure, only points in which this substation circuit differs from the substation circuit of FIG. 1 will be dealt with. In this substation circuit there are six gravity-switch contacts X1, X6, X9, X10, X11 and X12, all of which are shown in their unoperated conditions. Contact X12 is ineffective unless two terminals P and Q are strapped together for a purpose that will be referred to later in this description. For the time being it will be assumed that terminals P and Q are not strapped together. The single germanium transistor VT5 of the substation circuit is of the p-n-p type. In the normal condition of the substation circuit, the transducer T is connected in a complex circuit comprising, in addition to this transducer, a balance network (NR2, C14, C15, R18, R19), a biasing resistor R16, induction coil windings L1 and L3, and a capacitor C13, and extending between the emitter and base of transistor VT5, the transducer T being thereby connected to serve as a tone sounder. Further, in the normal condition of the substation circuit, a capacitor C12, of sufficient capacity (for example 1.8 microfarads) to cause it to present only a low impedance to currents of tone frequency, is connected between the emitter of transistor VT5 and the left-hand (as shown) end of induction coil winding L2. With such connections, the induction coil is connected to serve, by virtue of the inductive coupling between its winding L2 on the one hand and its windings L1 and L3 on the other hand, as a coupling means providing positive feedback from the output circuit of the amplifying stage constituted by the transistor VT5 to the input circuit of this amplifying stage. This provision for positive feedback is such as to cause the amplifying stage formed by transistor VT5 to constitute a transistor oscillator for supplying operating tone current to the transducer T in response to received low-frequency alternating ringing current. In the normal condition of the substation circuit, the biasing resistor R16 and a further biasing resistor R17 serve in conjunction to provide for the proper biasing of the base of transistor VT5 during operation of this transistor as an oscillator. The resistor R17 is an adjustable one of potentiometer type, and may be such as to provide a maximum resistance of 10,000 ohms.

Upon the receipt (while the substation circuit is in the normal condition) of low-frequency alternating ringing current over the line wires, the transistor oscillator constituted by transistor VT5 oscillates for a period within the duration of each output pulse produced by the rectifier bridge MRB in respect of the received ringing current, and during each such period supplies, in the form of the alternating current flowing in the base circuit of the transistor, operating tone current to transducer T. The frequency of oscillation is determined mainly by the values of the capacitors C12, C13 and C15 and of the resistors R16 and R17, and the inductances of the transducer T and of the windings of the induction coil, and can be adjusted by adjustment of resistor R17.

If it is desired that the transducer T, when serving as a tone sounder, should emit an audible calling signal distinguished from that given by tone current that is interrupted at twice the frequency of the low-frequency alternating ringing current, then terminals P and Q may be strapped together to partly disable the rectifier bridge MRB so as to cause this bridge to produce only one output pulse per cycle of received ringing current.

When the handset is lifted or removed, the gravity-switch contacts X1, X6, X9, X10, X11 and X12, upon their resulting operation, effect circuit changes that serve to bring the substation circuit to a condition in which certain components are connected and serve as follows (ignoring what happens during dialling at the substation). The transducer T and the capacitor C12 are connected in series between the emitter and base of transistor VT5, the transducer T being thereby connected to serve as the transmitter of the substation circuit. As a consequence of the operation of contact X11, the biasing of the base of transistor VT5 is effected by way of resistor R16 alone, and the two induction coil windings L1 and L3 are connected to cause the inductance coil to serve as an anti-sidetone induction coil. The transistor VT5 constitutes a single-stage transistor amplifier for amplifying the electric output of the transducer T and feeding amplified speech currents to line, the necessary direct current supply for this amplifier being provided, of course, by direct current flowing in the line wires and supplied from the exchange. The alternating current path over capacitor C13 is open at contact X10, and, in a case where terminals P and Q are strapped together, the strap is rendered ineffective by the open condition of contact X12.

The capacities of capacitors C12, C13, C14 and C15 may be 1.8 microfarads, 0.25 microfarad, 0.25 microfarad, and 0.5 microfarad respectively, and the resistances of resistors R16, R18 and R19 may be 18,000 ohms, 56 ohms, and 82 ohms respectively.

Referring now to FIG. 4 and the central battery telephone system substation circuit illustrated in this figure, only points in which this substantion circuit differs from the substation circuit of FIG. 1 will be dealt with. In this substation circuit there are six gravity-switch contacts X1, X2, X13, X14, X15 and X16, all of which are shown in their unoperated conditions. Contacts X13, which is a change-over contact, serves merely as a break contact when the substation circuit is used with two terminals J and K strapped together as shown. For the time being it will be assumed that terminals J and K are strapped together. Contact X16 is ineffective when the substation circuit is used with two terminals G and H strapped together as shown. For the time being it will be assumed that terminals G and H are strapped together. Both of the two silicon transistors VT6 and VT7 included in the substation circuit are of the n-p-n type. In this substation circuit there are three varistors NR1, NR2, and NR4, three selenium rectifiers MR1 to MR3, a silicon or germanium diode MR4, a ballast resistor or lamp TH1, and a thermistor TH2. With terminals J and K strapped together the thermistor TH2 is ineffective, so that if desired this thermistor need only be provided, and connected in circuit between terminals J and K, in cases where the substation circuit is used with these terminals not strapped together. In this substation circuit, varistor NR1, although having a resistor R21 in series with it, performs functions that correspond to those performed by the varistor NR1 of FIG. 1. The function of varistor NR4 is to cause, without acting to impede materially the flow of low-frequency alternating ringing current when such is received over the line wires, the substation circuit in its normal condition to present a high input impedance, as seen from the line, in regard to speech currents. Accordingly, varistor NR4 is chosen to have characteristics such that its alternating current resistance is of the order of 50,000 ohms so far as said input impedance in regard to speech currents is concerned, and such that its alternating current resistance is relatively low and negligible so far as low-frequency alternating ringing current received over the line wires is concerned. A resistor R29, included in series with varistor NR4 and having a resistance of, for example, 1,000 ohms, serves as an energy-dissipating resistor that in conjunction with the rectifier bridge MRB takes part in giving the substation circuit a measure of protection against high-voltage surges that may appear across the line wires (for example surges such as may be induced by lightning). The selenium rectifiers MR2 and MR3, connected across the transducer R that serves as the receiver, serve in known manner as a "click" suppression device for the receiver. In the normal condition of the substation circuit, the transducer T and capacitor C2 are connected in a complex circuit across induction coil winding L3, this complex circuit being one including contact X2, a resistor R24 (unless a switch S is closed), and a balance network (R26, C18, C19, R27, R28, NR2), and the transducer T being thereby connected to serve as a tone sounder. Further, in the normal condition of the substation circuit, the induction coil winding L2 is connected in the output circuit of the amplifying stage constituted by transistor VT7, and this output circuit includes, since contact X13 is unoperated, an electrolytic capacitor C20 of high capacity (for example 10 microfarads). Also, in the normal condition of the substation circuit, the induction coil winding L1 is connected to cause the induction coil to serve, by virtue of the inductive coupling between its windings L2 and L1, as a coupling means providing positive feedback from the output circuit of the amplifying stage constituted by transistor VT7 to the input circuit of this amplifying stage. The relevant manner of connection of winding L1 is such that this winding is connected in a complex circuit including the balance network (R26, C18, C19, R27, R28, NR2) and a capacitor C16, and extending between the lower (as shown) terminal of selenium rectifier MR1 and the base of transistor VT7. This provision for positive feedback is such as to cause the amplifying stage formed by transistor VT7 to constitute a transistor oscillator for supplying operating tone current to the transducer T in response to received low-frequency alternating ringing current. So far as this oscillator is concerned, the induction coil serves not only as a coupling means providing positive feedback as just stated, but also, by virtue of the inductive coupling between windings L2 and L3, as an output transformer serving to couple the collector circuit of transistor VT7 to the transducer T. In the normal condition of the substation circuit, biasing resistor R20 and the diode MR4, together with resistors R25 and R28 and varistor NR2, serve in conjunction to provide for the proper biasing of the base of transistor VT7 during operation of this transistor as an oscillator. Capacitor C20, as well as serving as a storage and decoupling capacitor for the purposes of such operation of transistor VT7, also serves to assist in causing the substation circuit to possess, in its normal condition, a useful degree of immunity from false operation of the transducer T, acting as a tone sounder, by transients on the line.

Upon the receipt (while the substation circuit is in the normal condition) of low-frequency alternating ringing current over the line wires, the transistor oscillator constituted by transistor VT7 oscillates in response to the voltage built up across capacitor C20 in respect of the received ringing current, and supplies operating tone current to transducer T. The frequency of oscillation is determined mainly by the values of the resistor R20 and the capacitor C16 and only to a lesser extent by the other circuit components. With a voltage built up across capacitor C20 in respect of the received ringing current, the diode MR4 is biased to a conducting condition, so that an effective biasing circuit for the base transistor VT7 is provided over resistor R20. Capacitor C20 effectively decouples the oscillator from the line so far as the oscillatory output of the oscillator is concerned (and thereby prevents any appreciable transmission of tone current to line) and so far as the effect of line impedance on the oscillator is concerned. The subscriber to whom the substation circuit pertains has a choice between two volume levels as regards the audible calling signals given by the transducer T when it is acting as a tone sounder. The audible calling signals are given at the lower of the two levels when switch S is kept unoperated (open) as shown, and are given at the upper of the two levels when this switch has been moved to, and left in, the operated (closed) condition in which it short-circuits resistor R24.

When the handset is lifted or removed, the gravity-switch contacts X1, X2, X13, X14, and X15, upon their resulting operation, effect circuit changes that serve to bring the substation circuit to a condition in which certain components are connected and serve as follows (ignoring what happens during dialling at the substation). The series circuit comprising capacitor C1, resistors R1 and R29, and varistor NR4 is short-circuited over contacts X1 and DL. The transducer T and capacitor C2 are connected in the base circuit of transistor VT6, the transducer T being thereby connected to serve as the transmitter of the substation circuit. As a consequence of the operation of contacts X13 and X15, diode MR4 is biased to a substantially non-conducting condition by the leakage current of electrolytic capacitor C20, and the biasing of the base of transistor VT7 is determined by resistor R25. The two transistors VT6 and VT7 constitute a two-stage transistor amplifier for amplifying the electric output of the transducer T and feeding amplified speech currents to line, the necessary direct current supply for this amplifier being provided, of course, by direct current flowing in the line wires and supplied from the exchange. A capacitor C17 serves as a decoupling capacitor for the purposes of such direct current supply. The two transistors VT6 and VT7 are resistance-capacity coupled, the coupling resistance and the coupling capacitance being constituted by a resistor R22 and a capacitor C21 respectively. A resistor R23 provides for a suitable biasing of the base of transistor VT6. In regard to the two-stage amplifier constituted by transistors VT6 and VT7, current negative feedback is provided, in a manner which does not concern the present invention, by virtue of the presence of the ballast resistor or lamp TH1 in the emitter circuit of transistor VT7. As a consequence of the changing-over of contacts X14 and X15, the transducer R that serves as the receiver is connected in circuit, and the induction coil windings L1 and L3 are connected to cause the induction coil to serve as an anti-sidetone induction coil.

When the substation circuit is used with terminals J and K not strapped together and with thermistor TH2 provided, then in the normal condition of the substation circuit the presence of this thermistor in series in the relevant output connection from the rectifier bridge MRB gives the substation circuit an increased degree of immunity from false operation of the transducer T, acting as a tone sounder, by transients on the line. Such an increased degree of immunity may be required, for example, when the line is operated on a shared service basis.

When the subscriber's line concerned has low capacitance (as may occur for example in the case of an open-wire overhead line), then a better line balance for anti-sidetone purposes is obtained by using the substation circuit with terminals G and H not strapped (so that capacitor C19 and resistor R27 are rendered ineffective upon the operation of gravity-switch contact X16).

The capacities of capacitors C16, C17, C18, C19, and C21 may be 0.022 microfarad, 0.1 microfarad, 0.01 microfarad, 0.068 microfarad, and 0.9 microfarad respectively, and the resistances of resistors R20, R21, R22, R23, R24, R25, R26, R27, and R28 may be 33,000 ohms, 12 ohms, 1800 ohms, 22,000 ohms, 560 ohms, 15,000 ohms, 82 ohms, 470 ohms, and 6800 ohms respectively.

What we claim is:

1. A telephone substation circuit comprising gravity switch contacts having a normal condition and an operated condition, an eletcro-acoustic transducer, a transistor, a multi-winding induction coil, means including said gravity switch contacts for connecting said transistor, in the normal condition of said contacts, to complete an oscillator circuit the output of which is connected to said transducer, said oscillator circuit including windings of said induction coil in a positive feedback path thereof, means including said gravity switch contacts for connecting said transistor, in the operated condition of said contacts, to complete an amplifier circuit that is arranged to amplify output signals from said transducer, said last-mentioned means serving also to connect said induction coil as an anti-sidetone coil, a pair of line terminals for connecting said substation circuit to an exchange line, means for deriving energizing currents for said oscillator circuit, when said contacts are in said normal condition, solely from alternating current ringing signals supplied to said substation circuit by way of said line terminals, and means for applying energizing currents to said amplifier circuit by way of said line terminals when said contacts are in said operated condition, said transducer and said transistor operating as elements of a tone sounder that is responsive to receive ringing signals when said contacts are in said normal condition and operating as a microphone and amplifier when said contacts are in said operated condition.

2. A telephone system substation circuit according to claim 1 in which said multi-winding induction coil is connected to serve additionally as an output transformer of said transistor oscillator when said contacts are in their normal condition.

References Cited

UNITED STATES PATENTS

| | | |
|---|---|---|
| 2,824,175 | 2/1958 | Meacham et al. |
| 2,894,075 | 7/1958 | Kunckel. |
| 3,197,570 | 7/1965 | Lambourn. |

FOREIGN PATENTS

| | | |
|---|---|---|
| 218,885 | 11/1958 | Australia. |

KATHLEEN H. CLAFFY, Primary Examiner

W. A. HELVESTINE, Assistant Examiner

U.S. Cl. X.R.

179—81